GRID PLATE SEQUENTIAL SCANNING SYSTEM

Filed Nov. 29, 1955 3 Sheets-Sheet 1

Grant C. Riddle
INVENTOR.

BY Clarence A. O'Brien
and Harvey B. Jacobson
Attorneys

Grant C. Riddle
INVENTOR.
BY Clarence A. O'Brien and Harvey B. Jacobson
Attorneys March 21, 1961 G. C. RIDDLE 2,976,360

GRID PLATE SEQUENTIAL SCANNING SYSTEM

Filed Nov. 29, 1955 3 Sheets-Sheet 3

Grant C. Riddle
INVENTOR.

BY Clarence A. O'Brien
and Harvey B. Jacobson
Attorneys 2,976,360
Patented Mar. 21, 1961

2,976,360

GRID PLATE SEQUENTIAL SCANNING SYSTEM

Grant C. Riddle, Penn, Pa.
(USS Sterlet (SS392), % FPO, San Francisco, Calif.)

Filed Nov. 29, 1955, Ser. No. 549,588
7 Claims. (Cl. 178—7.3)

This invention relates to a grid plate sequential scanning system for use with a flat plate type screen for graphic presentation of information composed of successive sequence signals, such as are used at present for the transmission of television intelligence.

The primary object of the present invention resides in the provision of a grid plate sequential scanning system employing cold cathode triodes arranged for successive control of the grid circuits of the tubes using a minimum number of tubes and parts, thereby greatly simplifying the construction and operation of the system.

A further object of the invention resides in the provision of a grid plate sequential scanning system which substantially eliminates the loading effect on the controlling scanning circuit because the individual grid control circuits present a very low impedance to external circuits when they are in the energized state.

A further object of the invention resides in the utilization of a novel flat grid plate arrangement employing spaced horizontal grid leads as well as spaced vertical grid leads having a phosphorescent material sandwiched therebetween so arranged as to provide high fidelity reproduction of a television picture.

Still further objects and features of this invention reside in the provision of a grid plate sequential scanning system that is efficient in operation, capable of being utilized in any convenient size and with any desired number of grid wires in each of the vertical and horizontal grid planes so as to provide an arrangement of any desired amount of intersections or picture elements therebetween so as to be compatible with present or future systems of television and the like.

These together with the various ancillary objects and features of the invention which will become apparent as the following description proceeds, are attained by this grid plate sequential scanning system, a preferred embodiment of the entire system and various modifications of elements of the system being shown in the accompanying drawings, by way of example only, wherein:

Figure 1 is a schematic diagram of the sequential scanning system comprising the present invention;

Figure 2 includes schematic representations of the various wave form patterns of the signals and pulses applied on various components of the invention;

Figure 1:
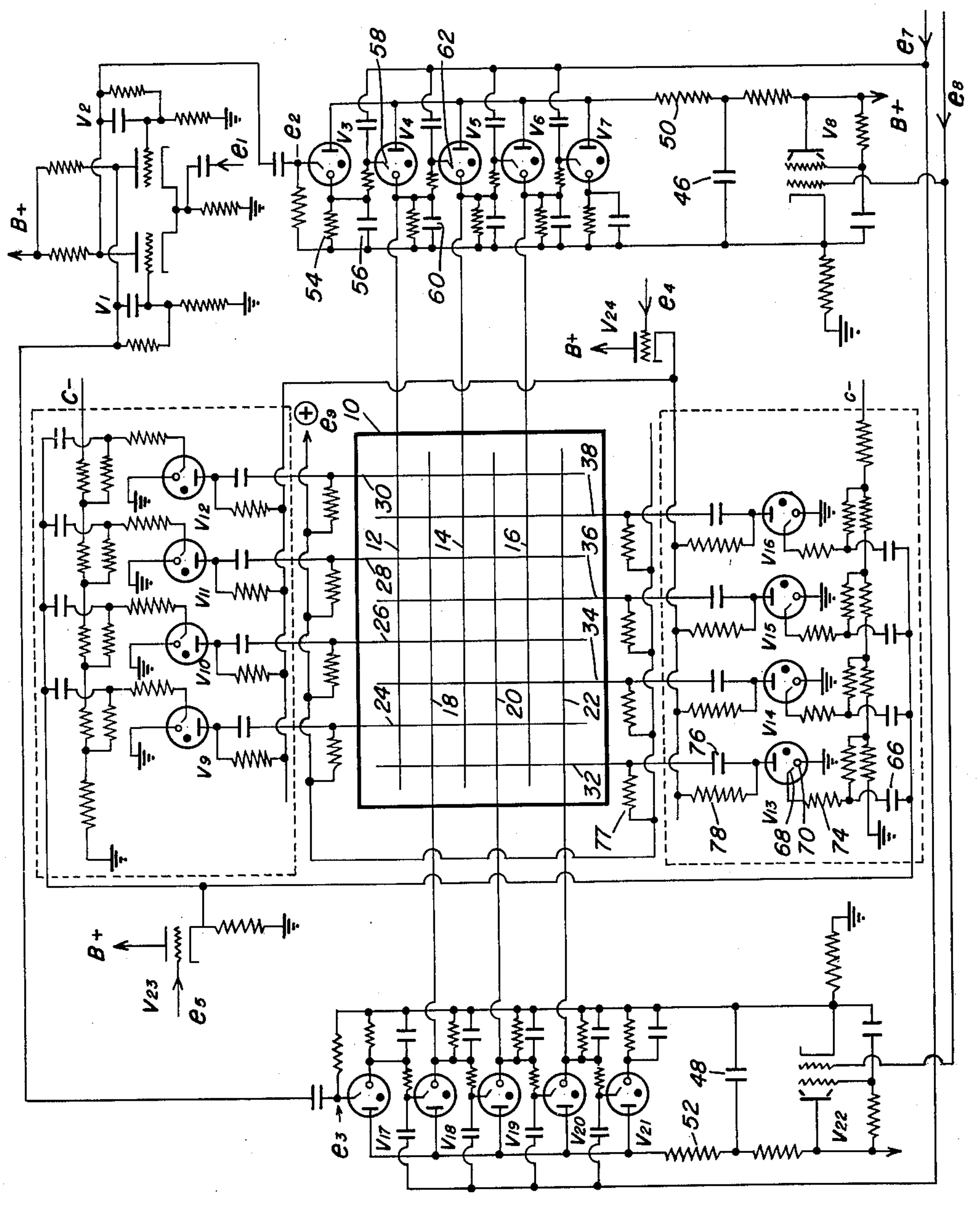
Figure 6:
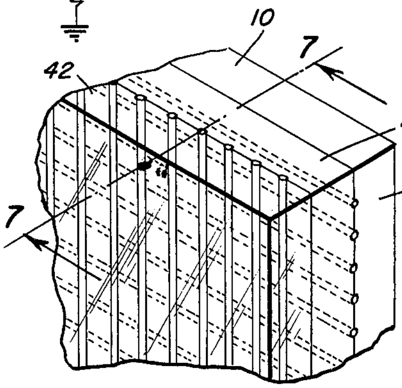
Figure 6 is a partial isometric view of the grid plate utilized in the invention.
Figure 7:
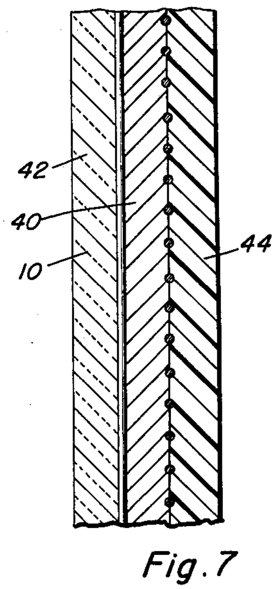
Figure 7 is a partial sectional view as taken along the plane of line 7—7 in Figure 6.

With continuing reference to the accompanying drawings wherein like reference numerals designate similar parts throughout the various views, and with particular attention initially directed to Figures 1, 6 and 7, reference numeral 10 is used to generally designate the grid plate screen which has a series of vertically spaced, horizontal grid leads 12, 14, 16, 18, 20 and 22 arranged therein as well as a series of horizontally spaced vertical grid leads 24, 26, 28, 30 as well as grid leads 32, 34, 36 and 38. Any suitable number of both vertical and horizontal grid leads can be utilized in order to assure high fidelity reproductions of television images and the like.

Sandwiched between the horizontal grid leads and the vertical grid leads is a panel 40 of phosphorescent material. A pane, as at 42, of clear glass or plastic material is positioned on one side of the sandwiched phosphorescent material, and may have a frosted inner surface for light diffusion. A transparent, translucent or opaque pane 44 is provided on the other side of the phosphorescent material 40 depending on the purpose to which the grid plate screen is to be utilized.

Figure 3:
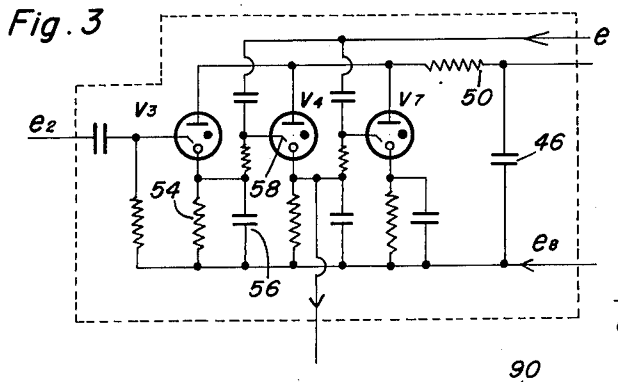
Figure 3 is a schematic representation of the basic circuits utilized in the vertical scanning system.
Figure 5:
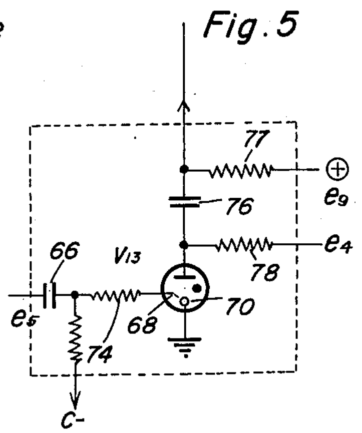
Figure 5 is a schematic representation of a portion of the horizontal scanning system.

The scanning circuits utilized in the invention are composed of repetitious use of two basic circuits which are shown separately in Figures 3 and 5, respectively. Both of these circuits utilize a cold cathode gas triode for its operation, and the construction of these tubes is such that a positive pulse on the grid brings the tube into conduction, and the tube remains in conduction until the plate voltage is removed. The voltage drop across the tube is constant during conduction time.

Figure 2:
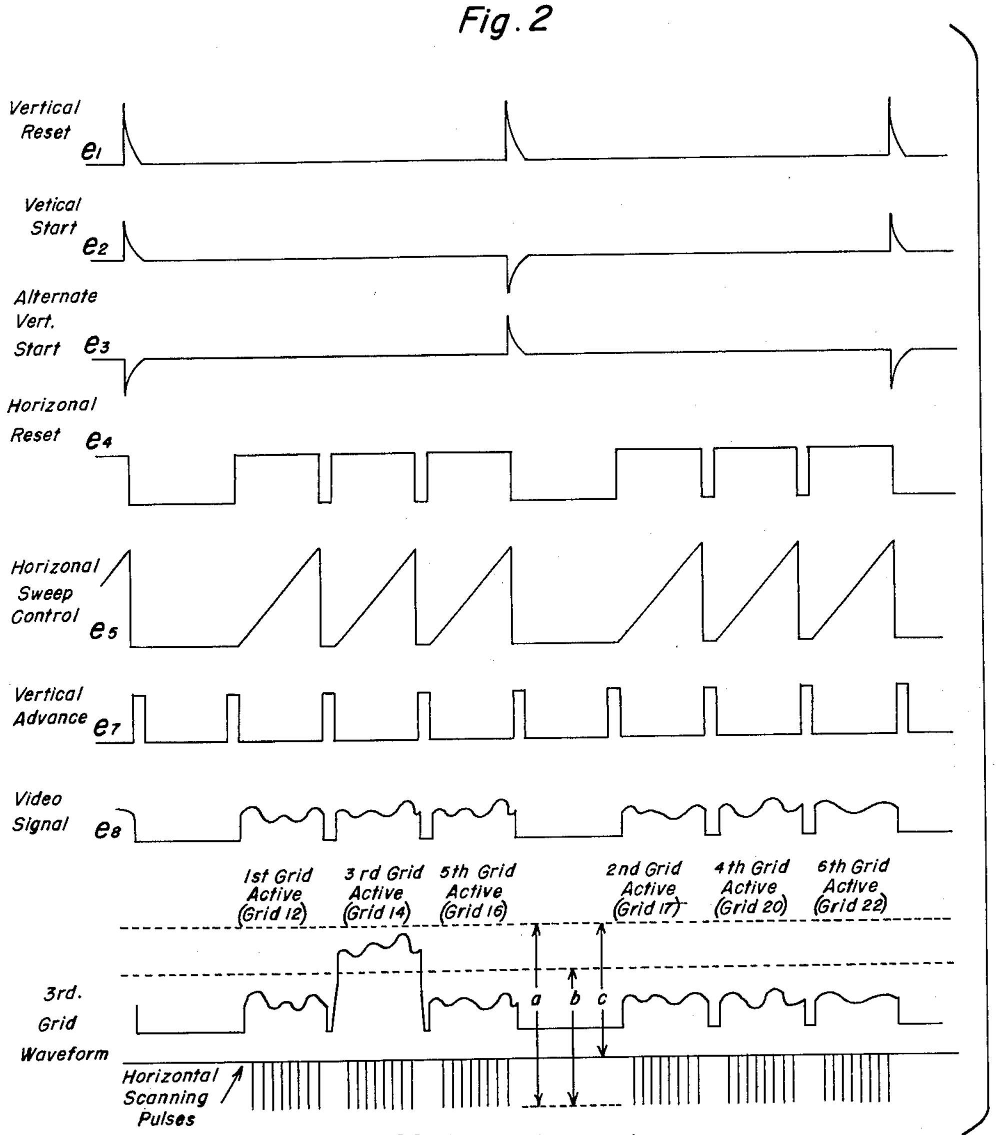

With further reference to Figures 1 and 3 as well as the wave form patterns shown in Figure 2, the operation of the vertical scanning circuit is such that the initial conditions include a voltage maintained across condensers 46 and 48 with this voltage also being across the gas tubes V–3—V–7 and V–17—V–21 respectively.

When any gas tube is conducting, the plate current causes a voltage drop across resistors 50 and 52.

The value of resistor 50 is such that the combined current through two tubes would be sufficient to cause the plate potential to drop below the extinguishing potential of the tubes. Of course, resistor 52 is similar in value to resistor 50.

The cathode circuit of the tubes is connected to a low potential source through which the intelligence or video signal $e_8$ is impressed. The condensers 46 and 48 maintain the plate circuits at the same reference potential to the cathode circuits by passing the variations of the video signal.

Signal $e_7$ consists of a positive pulse occurring at the finish of each horizontal scan forming the vertical advance pulse. This pulse is not large enough to bring any gas tube into conduction unless the grid of such tube has been given an enabling bias developed by conduction of the preceding tube. However, the vertical start signal $e_2$ is great enough to bring tube V–3 into conduction. This signal occurs on the beginning of each vertical scan. In the combined circuit, this pulse is alternated between the two interlacing vertical scan circuits. When tube V–3 conducts, its plate current causes a voltage to develop across its cathode resistor 54. The cathode condenser of tube V–3, as indicated at 56, is of such value as to delay this voltage rise by a few millionths of a second. This voltage will leak onto the grid, as at 58, of the following tube V–4 and act as an enabling bias. When the next vertical advance pulse $e_7$ occurs, it will bring tube V–4 into conduction.

At the instant the vertical advance pulse $e_7$ brings tube V–4 into conduction, the currents of the two tubes drop the plate potential. Because the cathode condenser 60 is not charged, and the cathode condenser 56 of tube V–3 is charged, and the condensers tend to hold their charge, the plate of tube V–3 will be dropped below its extinguishing potential by the constant plate voltage drop of tube V–4. When tube V–3 stops conducting, the plate potential maintains tube V–4 in conduction and raises the cathode potential of tube V–4. This potential along with its superimposed video signal $e_8$ is impressed on the grid plate lead 12 connected thereto, but now its D.C. reference level has been increased positive.

The cathode potential of tube V–4 then leaks to the grid 62 of tube V–5 which generally consists of a circuit similar to that of tube V–4 with this arrangement and operation being repeated over and over again, within limits. The final tube in the line is tube V–7 which comes into conduction and remains in conduction until the vertical start signal $e_2$ brings tube V–3 into conduction to start the sequence again. Of course, tubes V–17 through V–21 function similarly.

The basic circuits for the horizontal scanning system utilized to provide impulses on the horizontal grid leads 24, 26, 28, 30 and 32, 34, 36, 38, etc., employ tubes V–9—V–12 and tubes V–13—V–16. Since the tubes V–13—V–16 are actuated in a manner similar to that of the tubes V–9—V–12 only the circuits of the tubes V–13—V–16 are described. As can be seen best in Figure 5, the plate circuit of the tube V–13 has a positive potential applied, and the grid circuit has a negative bias applied. The horizontal sweep control voltage $e_5$ is a linear rising positive potential that is coupled through the grid circuit condenser 66 of tube V–13 to bring the grid 68 of tube V–13 to the conducting point. Since the grid 68 passes the zero bias level, it draws current from the cathode 70 of the tube V–13, but the series grid resistor 74 limits this current. The instant the tube V–13 conducts, the plate potential thereon is sharply dropped to the constant voltage drop of the tube V–13. This sharp negative pulse is coupled through the plate circuit condenser 76 through the attached grid plate lead 32 discharging a large negative voltage pulse to the grid plate grid. This pulse rapidly leaks off the capacitor 76 through the internal resistance of the grid plate 10. At a later time, the plate supply voltage is removed and the tube V–13 stops conduction, the plate condensers 76 then slowly recharge through the plate resistor 78 and grid resistor 77. The circuit for tube V–13 is connected in the combined circuit so that each of the tubes connects to an individual grid plate lead.

In the combined circuit, the horizontal scanning system is connected so that each succeeding tube grid is at an increasingly negative bias. This is accomplished by means of a voltage divider network connected to the negative c— potential. As the horizontal sweep control voltage $e_5$ rises, it tends to bring the tube grids to the conducting point in successive steps. The rate of these tubes' conduction depends on the rate of rise of the horizontal sweep control voltage $e_5$.

The sequence of operation of the complete circuit is as follows:

The outside control circuits, not shown, are receiving three signals, the horizontal signal synchronizing pulse, the vertical synchronizing pulse, and the video intelligence signal. These voltages are properly shaped and supplied to this circuit in the timed relationship shown in the wave form diagrams. The horizontal reset voltage $e_4$ is applied to tube V–24, and this signal causes the plate potential to be removed from the horizontal scanning tubes V–13, etc., causing any tube which has been conducting to stop conducting. At the same time, the horizontal sweep control voltage $e_5$ is returned to its most negative potential. Also, at the same time, the vertical advance pulse $e_7$ is applied to the vertical scanning tubes, such as V–3—V–7 and V–17—V–21, causing the next successive tube to conduct and bringing the next grid plate grid within enabling bias. At the end of the horizontal reset voltage $e_4$, the horizontal scanning tubes' plate potential is applied, and the horizontal scanning sweep control voltage $e_5$ is started. A stabilizing signal can be superimposed on the rising horizontal sweep control voltage $e_5$ to space the intervals between the horizontal sweep grid pulses.

The vertical reset voltage $e_1$ is applied to the cathode of an Eccles-Jordan type counter circuit which presents the vertical start voltage $e_2$ or $e_3$ in its proper polarity alternately to the vertical scanning circuits. The vertical scanning circuits operate as previously explained.

The bias potential between the horizontal and vertical grids is such that neither the video signal on the horizontal grid nor the negative pulse on the vertical grid is able to produce light emission from the phosphorescent material 40. But as each horizontal grid, controlled by the vertical scanning circuit, consecutively is brought to a positive enabling voltage upon which the video signal is superimposed, the negative pulse on the vertical grids is able to produce light emission from the phosphor. The brightness of this light is dependent upon the amount of voltage used to produce it. The negative pulse is a constant value set by the drop of the horizontal scanning tubes' plate potential when the tube conducts, but the video signal is a constantly varying D.C. potential applied to the horizontal grids. This variation of voltage will cause a proportional amount of variance in the brightness of the light produced by the phosphor. As the horizontal scanning circuit and the vertical scanning circuit follow their sequence of operation, every point on the grid plate 10 where two grid wires cross will be caused to glow by the amount of signal applied at that instant.

Figure 4:
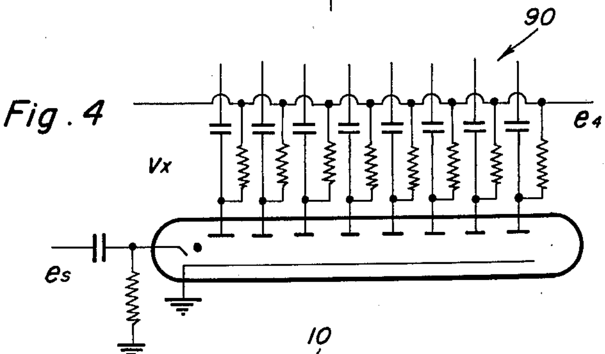
Figure 4 is a schematic diagram of circuits used for high speed sweep periods for the horizontal scanning circuit.

For high speed sweep periods, the horizontal scanning circuit as enclosed within the dotted line block of Figures 1 and 5 could be replaced by a tube and circuit generally designated at 90 in Figure 4. This tube 90 includes a tube $V_x$ which employs the ionization time of the gas filling the tube to produce the conduction travel along the tube. The construction of this tube is such as to keep the tube de-ionized even with a fairly high plate potential applied. Conduction is started by applying a pulse of a voltage $e_s$ to the igniter probe. Once the gas is ionized by this pulse $e_8$, the ionization travels down the tube to each plate in succession, retarded only by the time required for the gas to ionize. The output of this circuit is comparable to that described for the plate of tube V–13.

Figure 8:
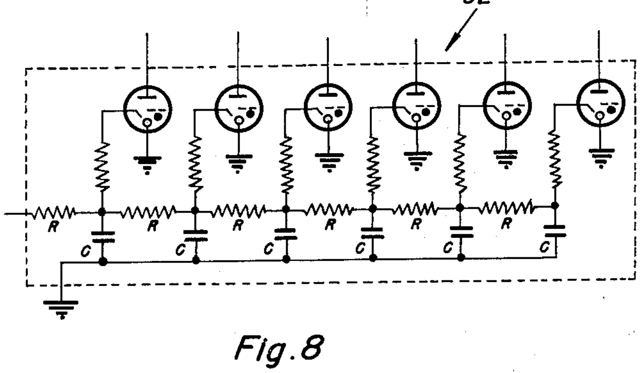
Figure 8 is a schematic representation of another circuit adapted for use with the horizontal scanning system.

Another possible variation for use with the horizontal scanning tubes employs the arrangement of parts as indicated by reference numeral 92 in Figure 8. This action is comparable to the arrangement of parts as is shown in Figure 5, with the exception of the means for varying the voltage on the starting anode. In this circuit, a square wave voltage is applied to the lead tube and the resistor-capacitor charge of the following circuits controls the advancement of the pulse along the line of the successive tubes. The synchronizing signal may be applied to the bottom end of the capacitors.

Figure 9:
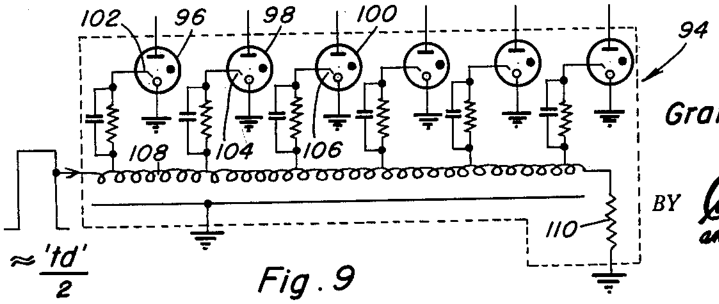
Figure 9 is a schematic representation of another circuit for use in conjunction with the invention, providing means of controlling the horizontal sweep discharge tubes.

A yet further modification of the invention is designated by reference numeral 94 and is shown in Figure 9. This circuit uses an artificial transmission line or delay line to replace the resistor-capacitor circuits within the dotted block of Figure 8 to time the arrival of the trigger voltage on the starting anode grids of the various gas discharge tubes 96, 98, 100, etc. In this form of the invention, the grids 102, 104 and 106 are connected to taps on the delay line 108 at the proper interval. This type of circuit has the advantage of having a relatively low impedance and very accurate timing. The accurate timing is the result of the isolation of the delay line from the power handling circuits by the cold cathode triodes. The shape of the pulse applied to the delay line is of optimum shape for transmission, since only the time of the leading edge of the pulse is the controlling factor and the cold cathode triodes create the sharp voltage pulse for application to the vertical grid leads. The resistor 110 is a terminating resistor to prevent reflected voltage waves from returning down the line in the reverse direction and causing undesired responses. Another advantage of this circuit which may be acquired with the proper construction of the gas discharge tubes 96, 98, 100, etc., is the simplification of the triggering control circuit. This would be accomplished by having the starter anode grids gain control of the plate current when plate voltage is very low and be able to cause conduction to stop when a negative voltage is applied to the grids. This will eliminate the need for the action described for the horizontal reset voltage $e_4$. The horizontal sweep control voltage $e_5$ would then be a square wave whose positive swing direction is approximately one-half of the delay time of the line 108, the negative swing amplitude being sufficient to stop the conduction of the gas discharge tubes 96, 98, 100, etc., and by that action allowing the cut-off tubes to automatically reset their conditions.

In a grid plate arrangement with approximately a 3′ x 4′ picture area, the optimum of performance of this arrangement can be realized. A suitable number of vertical and horizontal grid leads are used to obtain sufficiently high fidelity reproduction of a television picture. For compatibility with the present system of television, the horizontal sweep speed must be 55 microseconds long with a reset speed capability of 8 microseconds to correspond to the line period of 63.5 microsecond duration used.

It is noted that in Figure 2 there is also shown the grid wave form. The voltage excursions of the range indicated by "*b*" or "*c*" are not enough to excite the grid plate phosphor 40 to emit light. However, the voltage excursion of range "*a*" is sufficient to excite the grid plate phosphor 40 to maximum light emission. The range between the voltage excursions "*b*—*c*" and "*a*" produce a corresponding degree of light emission from minimum to a maximum providing a full range of light modulation. There should be a remark to the effect that the short pulses of the horizontal reset voltage $e_4$ and the vertical advance voltage $e_7$ need only be wide enough to complete their purposes.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A grid-plate scanning circuit for use in combination with a grid-plate for graphically reproducing by luminous points a signal applied on said scanning circuit, said grid-plate including a plurality of horizontally spaced vertical grid-leads and a plurality of vertically spaced horizontal grid-leads, said scanning circuit including means for applying a keyed signal voltage on said horizontal grid-leads, means for applying successive voltage pulses on each of said vertical grid-leads whereby the grid-plate will emit light at the crossover points of said horizontal grid-leads and said vertical grid-leads when said keyed signal voltage and said voltage pulses are coincident, said means for providing a keyed signal voltage on said horizontal grid-leads comprising a series of cold cathode tubes each having a plate, grid, and cathode, each of said cathodes of said tubes being connected to a separate horizontal grid-lead, means for applying the signal voltage to be reproduced on the cathodes of all said tubes simultaneously, said means including a cathode resistor and cathode condenser connected between each cathode and the signal transmission line with said cathode resistors being connected in parallel with said cathode condensers, means to key said signal voltage by superimposing a positive D.C. reference voltage on the selected grid-lead, said last named means including a cathode resistor, its conducting tube, a plate resistor in series in common with each of said tube plates, and a by-pass condenser connected between said plate resistor and said cathode resistor, said by-pass condenser having a voltage charge maintained through a resistor connected between said by-pass condenser and a voltage bus, the current through said conducting tube causing a voltage rise in said cathode resistor, said voltage rise being applied as said D.C. reference voltage, means to advance said keyed signal voltage by causing the next adjacent tube of said series of cold cathode tubes to initially conduct whereby the initial conduction of said next adjacent tube causes the said conducting tube to extinguish, said means including the series connection of said plate resistor, said initially conducting tube, said cathode condenser of said initially conducting tube, and said by-pass condenser, said cathode condenser causing a delay in the said voltage rise in said cathode resistor when said tube is initially conducting whereby the voltage drop across said plate resistor is sufficient to cause the plate potential of said conducting tube to drop below the extinguishing potential of said cold cathode tubes, means for causing the initial conduction of said next adjacent tube, said means including the series connection of a grid resistor and grid condenser, the junction of said grid resistor and said grid condenser connected to the grid of said next adjacent tube, a second terminal of said grid condenser connected to a pulse transmission line, said pulse transmission line being serially connected to all of said grid condensers, a second terminal of said grid resistor connected to said cathode condenser of said conducting tube whereby the voltage rise on said cathode condenser is applied as an enabling potential on the grid condenser of the next adjacent tube whereupon a voltage pulse applied to the said grid condensers from said pulse transmission line will cause said adjacent tube to initially conduct.

2. A grid-plate scanning circuit for use in combination with a grid-plate for graphically reproducing by luminous points a signal applied on said scanning circuit, said grid-plate including a plurality of horizontally spaced vertical grid-leads and a plurality of vertically spaced horizontal grid-leads, said scanning circuit including means for applying a keyed signal voltage on said horizontal grid-leads, means for applying successive voltage pulses on each of said vertical grid-leads whereby the grid-plate will emit light at the crossover points of said horizontal grid-leads when said keyed signal voltage and said voltage pulses are coincident, said means for applying said keyed signal on said horizontal grid-leads including a series of cold cathode tubes each having a plate, grid, and cathode, each of said cathodes of said tubes being connected to a separate horizontal grid lead, a cathode resistor and a cathode condenser connected between each of said cathodes and the signal transmission line, said cathode resistors being connected in parallel with said cathode condensers, said means for providing successive voltage pulses on said vertical grid-leads comprising a series of cold cathode tubes having a plate, grid, and cathode, means for applying a potential on the said plates of said tubes, said means being a series of resistors connected between said plates and a voltage bus, means whereby when said tubes conduct, successive negative voltage pulses are applied on each of said grid-leads, said means being a series of plate condensers connected between said plates and said grid-leads, so that when said tubes conduct, the sharp drop of said tubes' plate potential is coupled to said grid-leads, means for causing said tubes to successively conduct, said last named means being a linear rising potential on the said grids of said tubes to successively bring said tubes to the conductive point, means to apply said linear rising potential on said grids, including the series connection of a grid condenser and grid resistor, the junction of said grid condenser and grid resistor being connected to a limiting resistor, a second terminal of each said limiting resistors being connected to the said grids, a second terminal of each said grid resistors being connected to successive taps of a voltage divider network, a second terminal of said grid condensers being connected to a linear rising potential bus whereby said linear rising potential is coupled to said grid.

3. The combination of claim 2 wherein said means for causing said tubes to successively conduct include successive pulses applied on said grids of said tubes, means for applying said successive pulses on said grids, including a tapped pulse delay line, a resistor and condenser connected in series with said taps on said delay line and said grids, said resistor being connected in parallel with said condenser whereby D.C. pulses transmitted along said delay line will appear in timed succession at the said grids of said tubes.

4. A grid-plate scanning circuit for use in combination with a grid-plate for graphically reproducing by luminous points a signal applied on said scanning circuit, said grid-plate including a plurality of horizontally spaced vertical grid-leads and a plurality of vertically spaced horizontal grid-leads, said scanning circuit including means for applying a keyed signal voltage on said horizontal grid-leads, means for applying successive voltage pulses on each of said vertical grid-leads whereby the grid-plate will emit light at the crossover points of said horizontal grid-leads when said keyed signal voltage and said voltage pulses are coincident, said means for applying said keyed signal on said horizontal grid-leads including a series of cold cathode tubes each having a plate, grid, and cathode, each of said cathodes of said tubes being connected to a separate horizontal grid lead, a cathode resistor and a cathode condenser connected between each of said cathodes and the signal transmission line, said cathode resistors being connected in parallel with said cathode condensers, said means for providing said voltage pulses on said vertical grid-leads including a single cold cathode tube having a series of plates, a cathode, and an ignition probe, means for applying a potential on said plates of said tube, said means being a series of resistors connected between said plates and a voltage bus, means whereby when said tube conducts, successive negative voltage pulses are applied on each of said grid-leads, said means being a series of plate condensers connected between said plates and said grid-leads, when said tube conducts the sharp drop of said tube's plate potential is coupled to said grid-leads, means for causing the successive conduction of said plates, said means being the geometrical construction of the said tube, said plates, and said cathode, and utilizing the ionization time of the contained gas to delay the transfer of conduction from one said plate to the adjacent said plate in turn.

5. The combination of claim 1 wherein said means for providing successive voltage pulses on said vertical grid-leads comprising a series of cold cathode tubes having a plate, grid, and cathode, means for applying a potential on the said plates of said tubes, said means being a series of resistors connected between said plates and a voltage bus, means whereby when said tubes conduct, successive negative voltage pulses are applied on each of said grid-leads, said means being a series of plate condensers connected between said plates and said grid-leads, so that when said tubes conduct, the sharp drop of said tube's plate potential is coupled to said grid-leads, means for causing said tubes to successively conduct, said last named means being a linear rising potential on the said grids of said tubes to successively bring said tubes to the conductive point, means to apply said linear rising potential on said grids, including the series connection of a grid condenser and grid resistor, the junction of said grid condenser and grid resistor being connected to a limiting resistor, a second terminal of each said limiting resistors being connected to the said grids, a second terminal of each said grid resistors being connected to successive taps of a voltage divider network, a second terminal of said grid condensers being connected to a linear rising potential bus whereby said linear rising potential is coupled to said grid.

6. The combination of claim 1 wherein said means for causing said tubes to successively conduct include successive pulses applied on said grids of said tubes, means for applying said successive pulses on said grids, including a tapped pulse delay line, a resistor and condenser connected in series with said taps on said delay line and said grids, said resistor being connected in parallel with said condenser whereby D.C. pulses transmitted along said delay line will appear in timed succession at the said grids of said tubes.

7. The combination of claim 1 wherein said means for providing said voltage pulses on said vertical grid-leads including a single cold cathode tube having a series of plates, a cathode, and an ignition probe, means for applying a potential on said plates of said tube, said means being a series of resistors connected between said plates and a voltage bus, means whereby when said tube conducts, successive negative voltage pulses are applied on each of said grid-leads, said means being a series of plate condensers connected between said plates and said grid-leads, when said tube conducts the sharp drop of said tube's plate potential is coupled to said grid-leads, means for causing the successive conduction of said plates, said means being the geometrical construction of the said tube, said plates, and said cathode, and utilizing the ionization time of the contained gas to delay the transfer of conduction from one said plate to the adjacent said plate in turn.

References Cited in the file of this patent

UNITED STATES PATENTS

| | | |
|---|---|---|
| 2,651,006 | Mederos | Sept. 1, 1953 |
| 2,670,402 | Marks | Feb. 23, 1954 |
| 2,698,915 | Piper | Jan. 4, 1955 |
| 2,722,630 | Branch | Nov. 1, 1955 |
| 2,765,426 | Faulkner | Oct. 2, 1956 |
| 2,787,729 | Sternbeck | Apr. 2, 1957 |
| 2,818,531 | Peek | Dec. 31, 1957 |

FOREIGN PATENTS

| | | |
|---|---|---|
| 708,170 | Great Britain | Apr. 28, 1954 |